United States Patent
Chen et al.

(10) Patent No.: US 12,094,051 B2
(45) Date of Patent: Sep. 17, 2024

(54) PROCESSING DEVICE AND PROCESSING METHOD FOR RAY TRACING ACCELERATION STRUCTURE

(71) Applicant: Shanghai Biren Technology Co., Ltd, Shanghai (CN)

(72) Inventors: Lin Chen, Shanghai (CN); Feng Han, Shanghai (CN)

(73) Assignee: Shanghai Biren Technology Co., Ltd, Shanghai (CN)

( * ) Notice: Subject to any disclaimer, the term of this patent is extended or adjusted under 35 U.S.C. 154(b) by 44 days.

(21) Appl. No.: 17/938,937

(22) Filed: Sep. 7, 2022

(65) Prior Publication Data
US 2024/0020908 A1 Jan. 18, 2024

(30) Foreign Application Priority Data
Jul. 15, 2022 (CN) .......................... 202210837376.2

(51) Int. Cl.
*G06T 15/00* (2011.01)
*G06T 15/06* (2011.01)

(52) U.S. Cl.
CPC ............ *G06T 15/005* (2013.01); *G06T 15/06* (2013.01); *G06T 2210/12* (2013.01)

(58) Field of Classification Search
None
See application file for complete search history.

(56) References Cited

U.S. PATENT DOCUMENTS

| | | | |
|---|---|---|---|
| 9,754,405 B1* | 9/2017 | Young | G06T 17/005 |
| 2008/0192050 A1* | 8/2008 | Schardt | G06T 15/06 |
| | | | 345/421 |
| 2014/0204080 A1* | 7/2014 | Goel | G06T 15/005 |
| | | | 345/419 |
| 2020/0050550 A1* | 2/2020 | Muthler | G06T 15/06 |
| 2021/0390755 A1* | 12/2021 | Muthler | G06T 15/005 |
| 2022/0051467 A1* | 2/2022 | Woop | G06T 15/06 |

(Continued)

OTHER PUBLICATIONS

IngoWald, Nate Morrical, Stefan Zellmann, Lei Ma, Will Usher, Tiejun Huang, and Valerio Pascucci. 2020. Using Hardware Ray Transforms to Accelerate Ray/Primitive Intersections for Long, Thin Primitive Types . Proc. ACM Comput. Graph. Interact. Tech. 3, 2, Article 17 (Aug. 2020).*

*Primary Examiner* — Sultana M Zalalee
(74) *Attorney, Agent, or Firm* — JCIP GLOBAL INC.

(57) ABSTRACT

The present disclosure provides to a processing device and a processing method for a ray tracing acceleration structure. The processing device includes a machine-readable storage medium and a processor. The processor executes a descriptor to simulate the interaction between the ray with the scene, and the descriptor includes a first pointer and a second pointer. The processor obtains the TLAS by using the first pointer. The processor traverses the TLAS to find a leaf node in the TLAS that intersects the ray, and the intersected leaf node includes an instance identifier. The processor obtains the intersected instance record from the instance buffer pointed to by the second pointer by using the instance identifier, and the intersected instance record includes a third pointer. The processor obtains the BLAS by using the third pointer. The processor traverses the BLAS to find a primitive node in the BLAS that intersects the ray.

5 Claims, 3 Drawing Sheets

(56) References Cited

U.S. PATENT DOCUMENTS

| | | | |
|---|---|---|---|
| 2022/0066819 A1* | 3/2022 | Nowicki | G06F 9/4881 |
| 2023/0097562 A1* | 3/2023 | Shkurko | G06T 3/4007 |
| | | | 345/418 |

* cited by examiner

PROCESSING DEVICE AND PROCESSING METHOD FOR RAY TRACING ACCELERATION STRUCTURE

CROSS-REFERENCE TO RELATED APPLICATION

This application claims the priority benefit of China application serial no. 202210837376.2, filed on Jul. 15, 2022. The entirety of the above-mentioned patent application is hereby incorporated by reference herein and made a part of this specification.

BACKGROUND

Technical Field

The present disclosure relates to an image rendering technology, and in particular, to a processing device and a processing method for a ray tracing acceleration structure and a machine-readable storage medium.

Description of Related Art

Ray tracing technology is capable of simulating the interaction between rays and the scene. For example, ray tracing may be used in image rendering systems to produce three-dimensional images. Three-dimensional images normally include a large number of primitives. Primitives are normally triangular primitives, but may sometimes be other shapes, such as other polygons, lines, or points. Ray tracing may identify primitives in the scene that intersect rays, and process the identified intersecting primitives (for example, by executing a shader program to process the primitives) to mimic the natural interaction between rays and the scene. Intersection tests between rays and primitives in the scene involves a lot of processing. Simple ray tracing techniques is capable of testing every ray for every primitive in the scene. For scenes with millions or even tens of billions of primitives, and applications that need to trace millions of rays, such simple ray tracing technique is inefficient.

Therefore, ray tracing techniques often adopts acceleration structures. Acceleration structures are able to reduce intersection tests. However, even with existing ray tracing acceleration structures, the rate at which intersection tests are performed may not be suitable for real-time rendering of images. How to process the ray tracing acceleration structure is one of many issues in this technical field.

SUMMARY

The present disclosure provides a processing device and a processing method for a ray tracing acceleration structure and a machine-readable storage medium, so as to efficiently process the ray tracing acceleration structure.

In an embodiment of the disclosure, the processing device includes a machine-readable storage medium and a processor. The machine-readable storage medium includes at least one thread group (or warp), at least one instance buffer, at least one top-level acceleration structure (TLAS) and at least one bottom-level acceleration structure (BLAS). A processor is coupled to the machine-readable storage medium for retrieving a thread group from the machine-readable storage medium and executing the thread group. The thread group includes at least one descriptor. The processor executes the descriptor to simulate the interaction between rays and the scene. The descriptor includes a first pointer for pointing to the TLAS of the scene and a second pointer for pointing to the instance buffer. The processor retrieves the TLAS from the machine-readable storage medium by using the first pointer. The processor traverses the TLAS based on the rays to find an intersected leaf node that intersects the rays in the TLAS. The intersected leaf nodes include instance identifiers for pointing to corresponding instances. The processor obtains intersected instance records corresponding to the intersected leaf nodes from the instance buffer pointed to by the second pointer by using the instance identifier. The intersected instance records include a third pointer for pointing to the BLAS of the scene. The processor retrieves the BLAS from the machine-readable storage medium by using the third pointer. The processor traverses the BLAS based on the rays to find an intersected primitive node that intersects the rays in the BLAS.

In an embodiment of the present disclosure, the processing method includes executing a descriptor to simulate the interaction between rays and the scene, the descriptor includes a first pointer for pointing to the TLAS of the scene and a second pointer for pointing to the instance buffer; retrieving TLAS by using first pointer; traversing the TLAS based on the rays to find an intersected leaf node that intersects the rays in the TLAS, the intersected leaf nodes include instance identifiers for pointing to corresponding instances; obtaining intersected instance records corresponding to the intersected leaf nodes from the instance buffer pointed to by the second pointer by using the instance identifier, the intersected instance records include a third pointer for pointing to the BLAS of the scene; retrieving the BLAS by using the third pointer; traversing the BLAS based on the rays to find an intersected primitive node that intersects the rays in the BLAS.

In an embodiment of the disclosure, the machine-readable storage medium is configured to store at least one thread group, at least one instance buffer, at least one TLAS, and at least one BLAS, and the thread group includes at least one descriptor. The processing method for the ray tracing acceleration structure may be implemented when the descriptor is executed by the processor.

Based on the above, the descriptor may point to the TLAS and the instance buffer through the first pointer and the second pointer, so the processor may efficiently obtain the TLAS corresponding to the descriptor and the content of the instance buffer. After traversing the TLAS, when the ray intersects a leaf node (instance) of the TLAS, the processor may find the intersected leaf node in the TLAS. Each leaf node includes an instance identifier for pointing to the corresponding instance. By using the second pointer and the instance identifier of the intersected leaf node, the processor may efficiently obtain the intersected instance record corresponding to the intersected leaf node from the instance buffer. Each instance record in the instance buffer includes a third pointer to the corresponding BLAS. By using the third pointer, the processor may efficiently obtain the corresponding BLAS. After traversing the corresponding BLAS, when the ray intersects a certain leaf node (primitive node) of the BLAS, the processor may find the intersected primitive node in the BLAS. In this manner, the processor may efficiently process the ray tracing acceleration structure.

DESCRIPTION OF THE EMBODIMENTS

Figure 1:
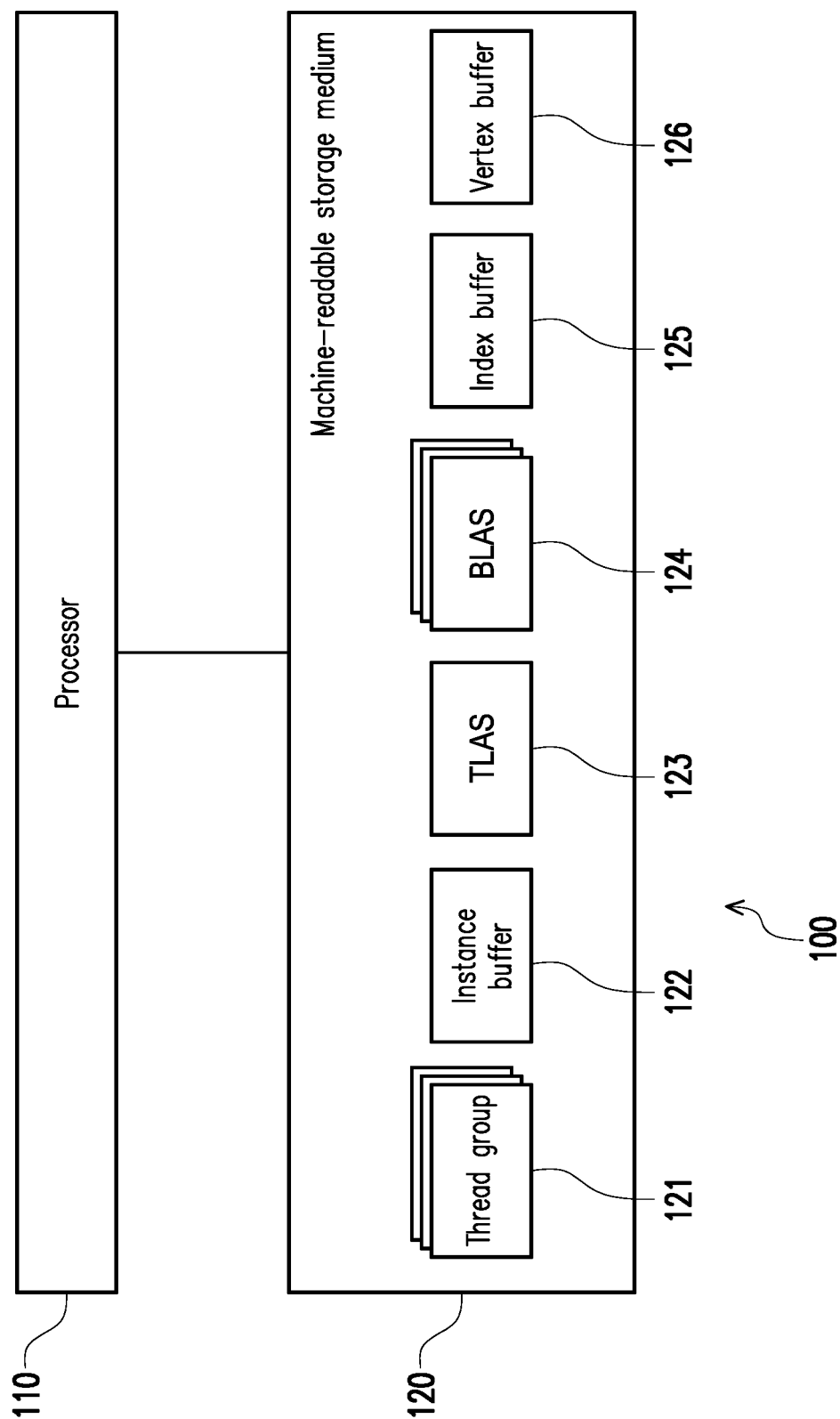
FIG. 1 is a schematic circuit block diagram of a processing device for a ray tracing acceleration structure according to an embodiment of the present disclosure.

Reference will now be made in detail to the exemplary embodiments of the present disclosure, examples of which are illustrated in the accompanying drawings. Wherever possible, the same reference numerals are used in the drawings and description to refer to the same or like parts.

The term "coupled (or connected)" as used throughout this specification (including the claims) may refer to any direct or indirect means of connection. For example, if it is described in the text that a first device is coupled (or connected) to a second device, it should be interpreted that the first device can be directly connected to the second device, or the first device can be indirectly connected to the second device through other devices or by some means of connection. Terms such as "first" and "second" mentioned throughout the specification (including the claims of the disclosure are used to denote the elements, not to limit the upper or lower limit of the number of elements, nor to limit the order of elements. In addition, where possible, elements/components/steps using the same reference numerals in the drawings and embodiments represent the same or similar parts. Elements/components/steps that use the same reference numerals or use the same terminology in different embodiments may serve as cross reference for each other.

The ray tracing acceleration structure may adopt either bounding volume hierarchy (BVH) structure or bounding box hierarchy structure. In the ray tracing acceleration structure, a large bounding box encloses one or more small bounding boxes, and each bounding box encloses multiple primitives. Based on such bounding volume hierarchy structure, intersection tests of ray tracing becomes easier. If the ray misses a bounding box, no intersection test is required for any child nodes (primitives) within that bounding box. In this manner, intersection tests may be reduced for the ray tracing acceleration structure.

The ray tracing acceleration structure includes a bottom-level acceleration structure (BLAS) and a top-level acceleration structure (TLAS). BLAS and TLAS may be BVH trees. BLAS has leaf nodes as object primitives. The top level of BLAS is a single root node. For example, BLAS may be used to describe a model of a single object in a scene or a group of objects in a scene. TLAS describes a high-level scene, starting from the top-level root node and ending at the bottom-level BLAS. TLAS may describe multiple instances of the same BLAS. For example, BLAS may simulate a single chair, while TLAS may simulate a concert hall that includes hundreds of chairs (instances), and each instance represents a different chair in a different location and/or orientation in the concert hall. Intersection tests are performed by traversing the BVH tree (BLAS and TLAS). If a given ray "hits" a bounding box (node), the ray needs to be tested for every child node of the bounding box (node). The test continues downward and passes through the BVH tree until at least one primitive (leaf node) is hit, or the ray misses all child nodes of an intersected node.

FIG. 1 is a schematic circuit block diagram of a processing device 100 for a ray tracing acceleration structure according to an embodiment of the present disclosure. The processing device 100 shown in FIG. 1 includes a processor 110 and a machine-readable storage medium 120. Depending on actual application, the machine-readable storage medium 120 may include main memory or any type of "non-transitory readable medium". For example, in some embodiments, the non-transitory readable medium includes, for example, a semiconductor memory, a programmable logic circuit, and/or a storage device. The machine-readable storage medium 120 stores at least one thread group (or warp) 121, at least one instance buffer 122, at least one TLAS 123, at least one BLAS 124, at least one index buffer 125, and at least one vertex buffer 126. The processor 110 is coupled to the machine-readable storage medium 120 to read data content. For the conciseness of drawings, FIG. 1 does not show the data transmission interface circuit between the machine-readable storage medium 120 and the data processing integrated circuit 120, because the data transmission interface circuit of the machine-readable storage medium 120 is a commonly known circuit.

It should be understood that the number of threads contained in a warp is a warp size, and the warp size is typically less than or equal to 128. For example, the warp size may be 4, 16, 32, 64, and 128, etc. In addition, a thread group may include multiple warps.

In other examples, a warp may also be called a warp ("xian cheng su" in Chinese). Correspondingly, a thread group may be called a thread group ("xian cheng zu" in Chinese). A thread group may include multiple warps.

Depending on the actual design, the processor 110 may include any type of integrated circuit. For example, the processor 110 may include a central processing unit (CPU), a graphics processing unit (GPU), a controller, a microcontroller, a microprocessor, an application-specific integrated circuit (ASIC), a digital signal processor (DSP), a field programmable gate array (FPGA) and/or other data processing circuits. The processor 110 may execute the thread group 121 (program) of the machine-readable storage medium 120.

Figure 2:
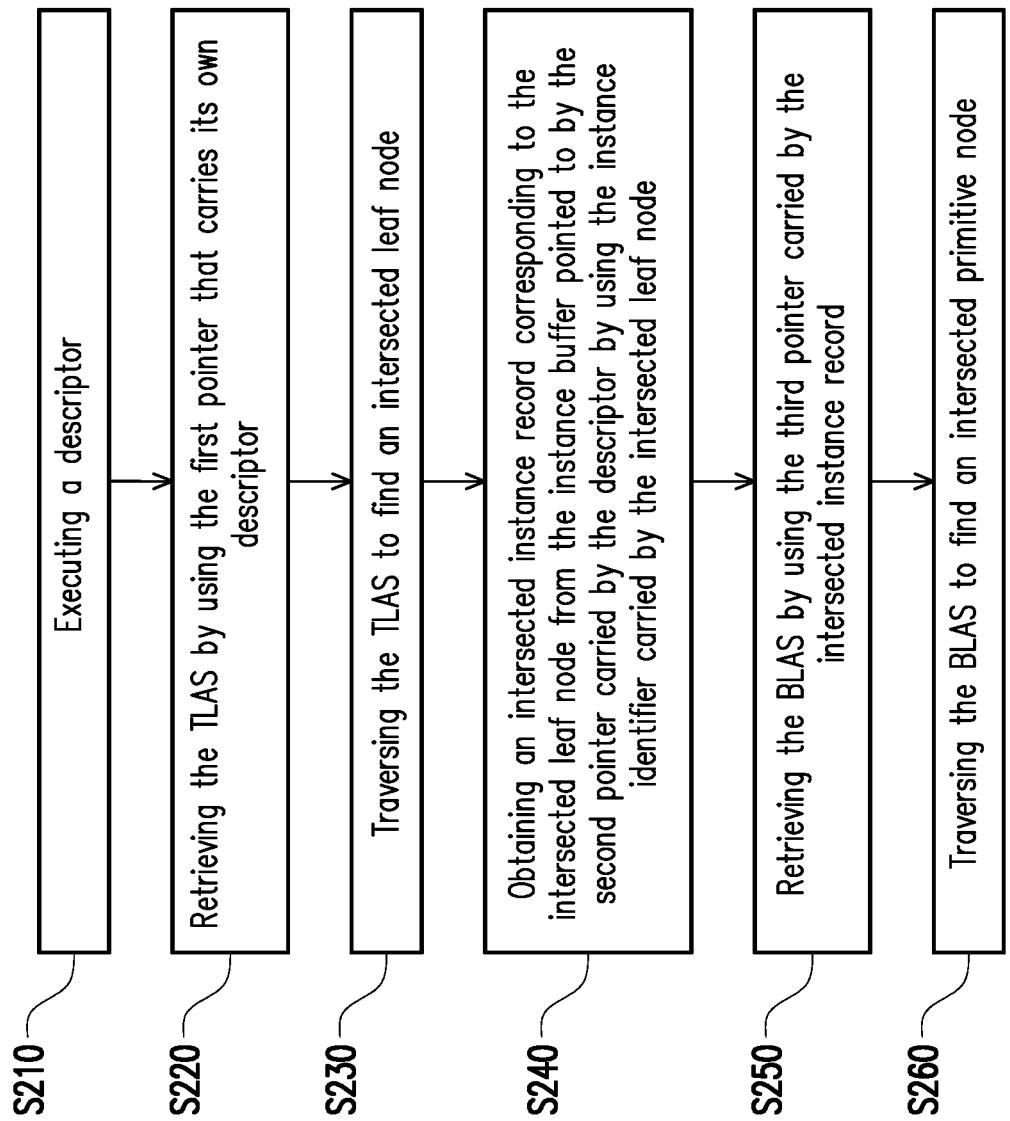
FIG. 2 is a schematic flowchart of a processing method for a ray tracing acceleration structure according to an embodiment of the present disclosure.

FIG. 2 is a schematic flowchart of a processing method for a ray tracing acceleration structure according to an embodiment of the present disclosure. Please refer to FIG. 1 and FIG. 2. In step S210, the processor 110 may obtain the thread group 121 from the machine-readable storage medium 120 and execute the thread group 121. The thread group 121 includes at least one descriptor. The descriptor may be executed by the processor 110 to simulate the interaction between rays and the scene. The descriptor includes a first pointer for pointing to the TLAS 123 of the scene and a second pointer for pointing to the instance buffer 122.

Figure 3:
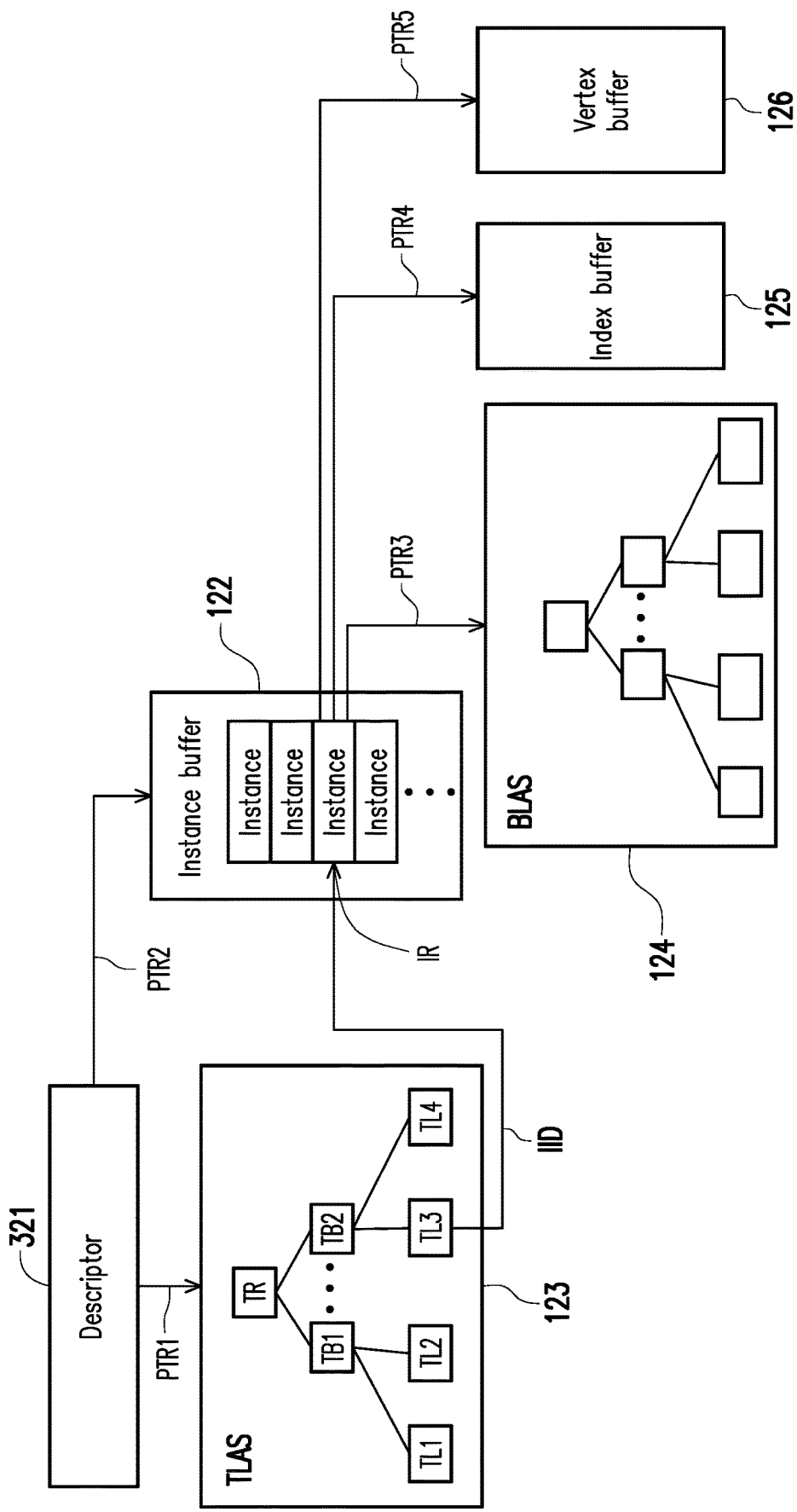
FIG. 3 is a schematic diagram of a top-level data structure according to an embodiment of the present disclosure.

FIG. 3 is a schematic diagram of a top-level data structure according to an embodiment of the present disclosure. According to the actual design, the instance buffer 122, TLAS 123, BLAS 124, index buffer 125 and vertex buffer 126 shown in FIG. 3 may be used as one of many embodiments of the instance buffer 122, TLAS 123, BLAS 124, index buffer 125 and vertex buffer 126 shown in FIG. 1. In the embodiment shown in FIG. 3, the thread group 121 includes a descriptor 321. The descriptor 321 has its own first pointer PTR1 for pointing to the TLAS 123 of the scene and a second pointer PTR2 for pointing to the instance buffer 122. This embodiment does not limit the implementation of the first pointer PTR1 and the second pointer PTR2. For example, the first pointer PTR1 may include the address of the TLAS 123 in the machine-readable storage medium 120 (or main memory), while the second pointer PTR2 may include the address of the instance buffer 122 in the machine-readable storage medium 120 (or main memory).

Please refer to FIG. 1, FIG. 2 and FIG. 3. The processor 110 may execute the descriptor 321 in step S210. In step S220, the processor 110 may obtain the TLAS 123 from the machine-readable storage medium 120 by using the first pointer PTR1 carried by the descriptor 321. Each leaf node (e.g., leaf nodes TL1, TL2, TL3, and TL4) in TLAS 123 includes an instance identifier for pointing to the corresponding instance. In step S230, the processor 110 may traverse the TLAS 123 based on the rays to find a leaf node that intersects the rays (hereinafter referred to as intersected leaf nodes) in the TLAS 123. The specific method for the processor 110 to traverse the TLAS 123 may be any intersection test for ray tracing, such as an existing intersection test or other intersection tests. The processor 110 may perform the intersection test starting from the root node TR. When the ray "hits" the root node TR (bounding box), the processor 110 may perform an intersection test for each child node (e.g., branch nodes TB1 and TB2) of the root node TR. Since the ray misses the branch node TB1 (bounding box), any child nodes of this branch node TB1 (e.g., leaf nodes TL1 and TL2) do not need to be subjected to the intersection test. It is assumed here that the ray hits the branch node TB2 (bounding box), so each child node of this branch node TB2 (for example, the leaf nodes TL3 and TL4) needs to be subjected to the intersection test. Here it is assumed that the ray hits the leaf node TL3.

Each instance record in the instance buffer 122 includes a third pointer for pointing to the corresponding BLAS in the scene, a fourth pointer for pointing to the corresponding index buffer, and a fifth pointer for pointing to the corresponding vertex buffer. In step S240, by using the instance identifier IID carried by the intersected leaf node TL3, the processor 110 may obtain the instance record IR (hereinafter referred to as the intersected instance record) corresponding to the intersected leaf node TL3 from the instance buffer 122 pointed to by the second pointer PTR2. The intersected instance record IR includes a third pointer PTR3 for pointing to the BLAS 124, a fourth pointer PTR4 for pointing to the index buffer 125, and a fifth pointer PTR5 for pointing to the vertex buffer 126. This embodiment does not limit the implementation of the third pointer PTR3, the fourth pointer PTR4 and the fifth pointer PTR5. For example, the third pointer PTR3 may include the address of the BLAS 124 in the machine-readable storage medium 120 (or main memory), and the fourth pointer PTR4 may include the address of the index buffer 125 in the machine-readable storage medium 120 (or main memory), and the fifth pointer PTR5 may include the address of the vertex buffer 126 in the machine-readable storage medium 120 (or main memory).

In step S250, the processor 110 may obtain the BLAS 124 from the machine-readable storage medium 120 by using the third pointer PTR3 carried by the intersected instance record IR. In step S260, the processor 110 may traverse the BLAS 124 based on the rays to find a leaf node (hereinafter referred to as intersected primitive nodes) that intersects the rays in the BLAS 124. The specific way that the processor 110 traverses the BLAS 124 may be any intersection tests for ray tracing, such as an existing intersection test or other intersection tests. The intersected primitive nodes include primitive identifiers. The processor 110 may obtain the primitive index number (hereinafter referred to as the intersected primitive index number) corresponding to the intersected primitive node from the index buffer 125 pointed to by the fourth pointer PTR4 by using the primitive identifier of the intersected primitive node. The processor 110 may obtain the primitive vertex coordinates corresponding to the intersected primitive node from the vertex buffer 126 pointed to by the fifth pointer PTR5 by using the intersected primitive index number.

To sum up, the descriptor 321 may point to the TLAS 123 and the instance buffer 122 through the first pointer PTR1 and the second pointer PTR2, so the processor 110 may efficiently obtain the TLAS 123 corresponding to the descriptor 321 and the content of the instance buffer. After traversing the TLAS 123, when the ray intersects an instance (e.g., intersected leaf node TL3) of the TLAS 123, the processor may find the intersected leaf node TL3 in the TLAS 123, thereby obtaining the instance identifier IID carried by this intersected leaf node TL3 for pointing to the corresponding instance. By using the second pointer PTR2 and the instance identifier IID of the intersected leaf node TL3, the processor 110 may efficiently obtain the intersected instance record IR corresponding to the intersected leaf node TL3 from the instance buffer 122, thereby obtaining the third pointer PTR3 carried by the intersected instance record IR for pointing to the corresponding BLAS 124, the fourth pointer PTR4 for pointing to the corresponding index buffer 125, and the fifth pointer PTR5 for pointing to the corresponding vertex buffer 126. By using the third pointer PTR3, the processor 110 may efficiently obtain the corresponding BLAS 124. After traversing the corresponding BLAS 124, when the ray intersects a certain leaf node (primitive node) of the BLAS 124, the processor 110 may find the intersected primitive node in the BLAS 124. In this manner, the processor 110 may efficiently process the ray tracing acceleration structure.

Finally, it should be noted that the above embodiments are only used to illustrate the technical solutions of the present disclosure, but not to limit them. Although the present disclosure has been described in detail with reference to the foregoing embodiments, those of ordinary skill in the art should understand that: The technical solutions described in the foregoing embodiments can still be modified, or some or all of the technical features thereof can be equivalently replaced; and these modifications or replacements do not make the essence of the corresponding technical solutions deviate from the scope of the technical solutions in the embodiments of the present disclosure.

What is claimed is:

1. A processing device for a ray tracing acceleration structure, comprising:
a machine-readable storage medium, comprising at least one thread group, at least one instance buffer, at least one top-level acceleration structure (TLAS) and at least one bottom-level acceleration structure (BLAS); and
a processor, coupled to the machine-readable storage medium for retrieving the thread group from the machine-readable storage medium and executing the thread group, wherein the thread group comprises at least one descriptor, the processor executes the descriptor to simulate an interaction between rays and a scene, the descriptor comprises a first pointer for pointing to the TLAS of the scene and a second pointer for pointing to the instance buffer, the processor retrieves the TLAS from the machine-readable storage medium by using the first pointer, the processor traverses the TLAS based on the rays to find an intersected leaf node that intersects the rays in the TLAS, the intersected leaf node comprises an instance identifier for pointing to a corresponding instance, the processor obtains an intersected instance record corresponding to the intersected leaf node from the instance buffer pointed to by the second pointer by using the instance identifier, the intersected instance record comprises a third pointer for pointing to the BLAS of the scene, the processor retrieves the BLAS from the machine-readable storage medium by using the third pointer, and the processor traverses the BLAS based on the rays to find an intersected primitive node that intersects the rays in the BLAS.

2. The processing device according to claim 1, wherein the machine-readable storage medium further comprises at least one index buffer and at least one vertex buffer, the intersected instance record further comprises a fourth pointer for pointing to the index buffer and a fifth pointer for pointing to the vertex buffer, the intersected primitive node comprises a primitive identifier, and the processor obtains an intersected primitive index number corresponding to the intersected primitive node from the index buffer pointed to by the fourth pointer by using the primitive identifier, and the processor obtains a primitive vertex coordinate corresponding to the intersected primitive node from the vertex buffer pointed to by the fifth pointer by using the intersected primitive index number.

3. A processing method for a ray tracing acceleration structure, wherein the processing method comprises:
   executing a descriptor to simulate an interaction between rays and a scene, wherein the descriptor comprises a first pointer for pointing to a TLAS of the scene and a second pointer for pointing to an instance buffer;
   retrieving the TLAS by using the first pointer;
   traversing the TLAS based on the rays to find an intersected leaf node that intersects the rays in the TLAS, wherein the intersected leaf node comprises an instance identifier for pointing to a corresponding instance;
   obtaining an intersected instance record corresponding to the intersected leaf node from the instance buffer pointed to by the second pointer by using the instance identifier, wherein the intersected instance record comprises a third pointer for pointing to a BLAS of the scene;
   retrieving the BLAS by using the third pointer; and
   traversing the BLAS based on the rays to find an intersected primitive node that intersects the rays in the BLAS.

4. The processing method according to claim 3, wherein the intersected instance record further comprises a fourth pointer for pointing to an index buffer and a fifth pointer for pointing to a vertex buffer, the intersected primitive node comprises a primitive identifier, and the processing method further comprises:
   obtaining an intersected primitive index number corresponding to the intersected primitive node from the index buffer pointed to by the fourth pointer by using the primitive identifier; and
   obtaining a primitive vertex coordinate corresponding to the intersected primitive node from the vertex buffer pointed to by the fifth pointer by using the intersected primitive index number.

5. A non-transitory readable medium having executable programming instructions stored thereon, wherein the executable programming instructions are configured to implement at least one thread group, at least one instance buffer, at least one TLAS, and at least one BLAS, wherein the thread group comprises at least one descriptor, and the processing method for the ray tracing acceleration structure claimed in claim 3 is able to be implemented when the descriptor is executed by a processor.

* * * * *